(12) United States Patent
Chen

(10) Patent No.: US 11,932,343 B2
(45) Date of Patent: Mar. 19, 2024

(54) HANDLEBAR GRIP SET

(71) Applicants: Q-LITE CO., LTD., Taichung (TW); KILEY LIGHTING TECHNOLOGY CO., LTD., Taichung (TW)

(72) Inventor: Bao-Liang Chen, Taichung (TW)

(73) Assignees: Q-LITE CO., LTD., Taichung (TW); KILEY LIGHTING TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 18/311,529

(22) Filed: May 3, 2023

(65) Prior Publication Data

US 2023/0365211 A1    Nov. 16, 2023

(30) Foreign Application Priority Data

May 11, 2022    (TW) .................................. 111204855

(51) Int. Cl.
| | | |
|---|---|---|
| *B62J 6/055* | (2020.01) | |
| *B62J 6/015* | (2020.01) | |
| *B62J 6/028* | (2020.01) | |
| *B62K 21/12* | (2006.01) | |
| *B62K 21/26* | (2006.01) | |

(52) U.S. Cl.
CPC ............... *B62J 6/055* (2020.02); *B62J 6/015* (2020.02); *B62J 6/028* (2020.02); *B62K 21/12* (2013.01); *B62K 21/26* (2013.01)

(58) Field of Classification Search
CPC ............... B62K 21/26; B62K 21/12–16; B62J 6/05–057
See application file for complete search history.

(56) References Cited

U.S. PATENT DOCUMENTS

| | | | | |
|---|---|---|---|---|
| 2010/0053984 A1* | 3/2010 | Wang | ....................... | B62J 6/015 362/474 |
| 2015/0027269 A1* | 1/2015 | Li | ......................... | B62K 21/12 74/551.9 |

FOREIGN PATENT DOCUMENTS

KR    20180006144 A  *  1/2018

* cited by examiner

*Primary Examiner* — Mariceli Santiago
(74) *Attorney, Agent, or Firm* — RABIN & BERDO, P.C.

(57) ABSTRACT

A handlebar grip set has two turn signals, two operating kits, and two grips. Each of the two turn signals is detachable and has a base, an illumination module assembled to the base, and a housing assembled to the base and covering the illumination module. Each operating kit has a button module electrically connected to the illumination module of a corresponding one of the turn signals. Each one of the grips surrounds the base of a corresponding one of the turn signals. The base of each turn signal is configured to be assembled to one of two ends of a handlebar. The turn signals of the handlebar grip set provide sufficient warning function when a bicycle equipped with the handlebar grip set is turning.

8 Claims, 7 Drawing Sheets

HANDLEBAR GRIP SET

BACKGROUND OF THE INVENTION

1. Field of the Invention

The present invention relates to a bicycle, and more particularly to a handlebar grip set with a function of turning signals.

2. Description of Related Art

With rising awareness of environmental protection such as energy saving and carbon-emission reduction, and also with the popularity of sports, people living in the urban area choose bicycles for transportation or commuting in the city again. After work or at leisure, people also ride bicycles in the city to exercise.

A conventional bicycle is merely equipped with bike reflectors on a bicycle frame thereof. However, the bike reflectors cannot provide sufficient warning function with vehicles in the city at dark. In order to prominently indicate turning directions of the conventional bicycle for other vehicles in the city, structure of handlebars of the conventional bicycle should be improved.

SUMMARY OF THE INVENTION

The main objective of the present invention is to provide a handlebar grip set with turn signals for indicating turning directions of bicycles.

The handlebar grip set has two turn signals, two operating kits, and two grips. Each of the two turn signals is detachable and has a base, an illumination module assembled to the base, and a housing assembled to the base and covering the illumination module. Each operating kit has a button module electrically connected to the illumination module of a corresponding one of the turn signals. Each one of the grips surrounds the base of a corresponding one of the turn signals. The base of each turn signal is configured to be assembled to one of two ends of handlebars. The turn signals of the handlebar grip set provide sufficient warning function when a bicycle equipped with the handlebar grip set is turning.

and

Figure 7:
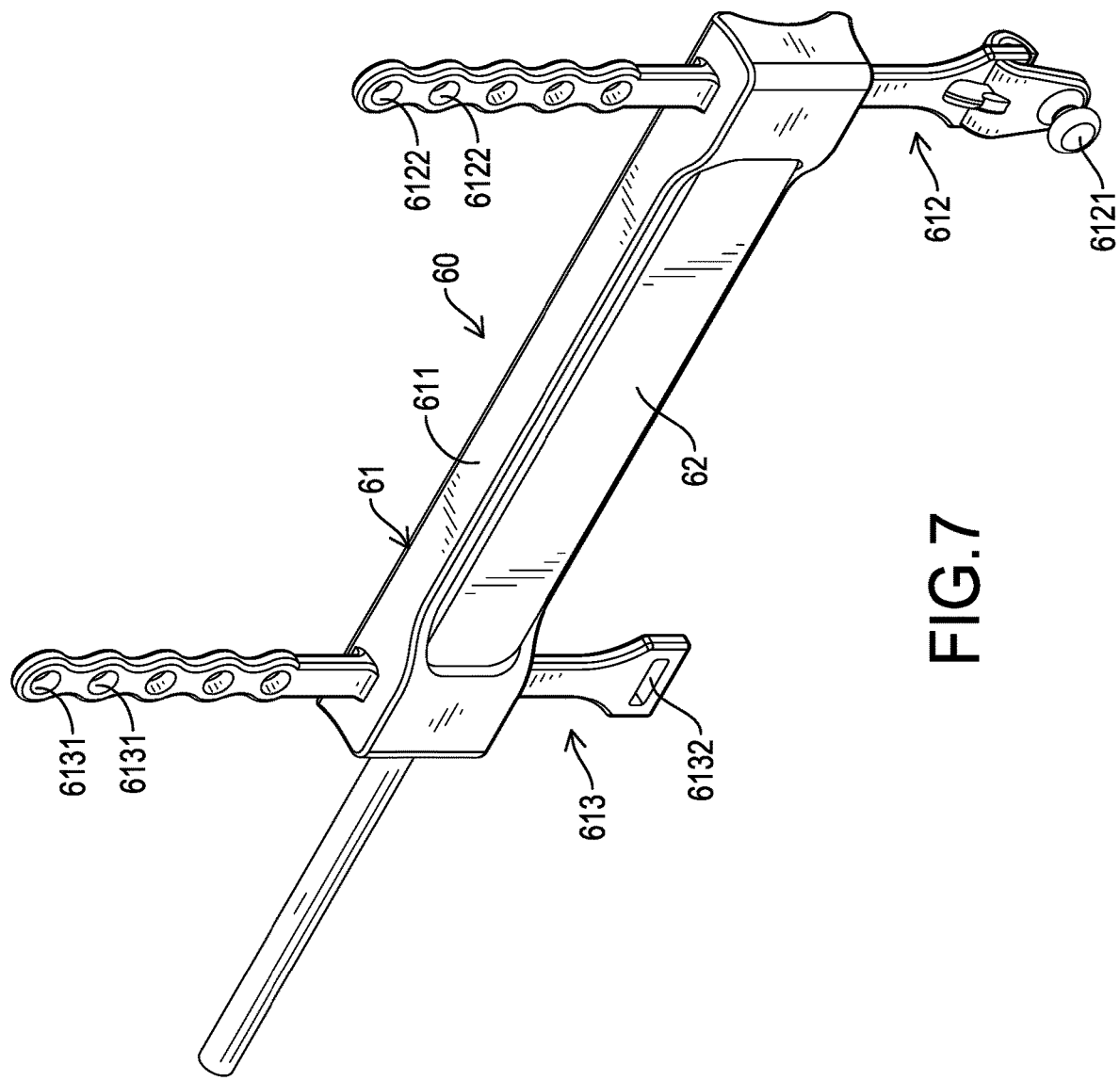

FIG. 7 is a perspective view of a rear trafficator used with the handlebar grip set in accordance with the present invention.

DETAILED DESCRIPTION OF PREFERRED EMBODIMENTS

Figure 1:
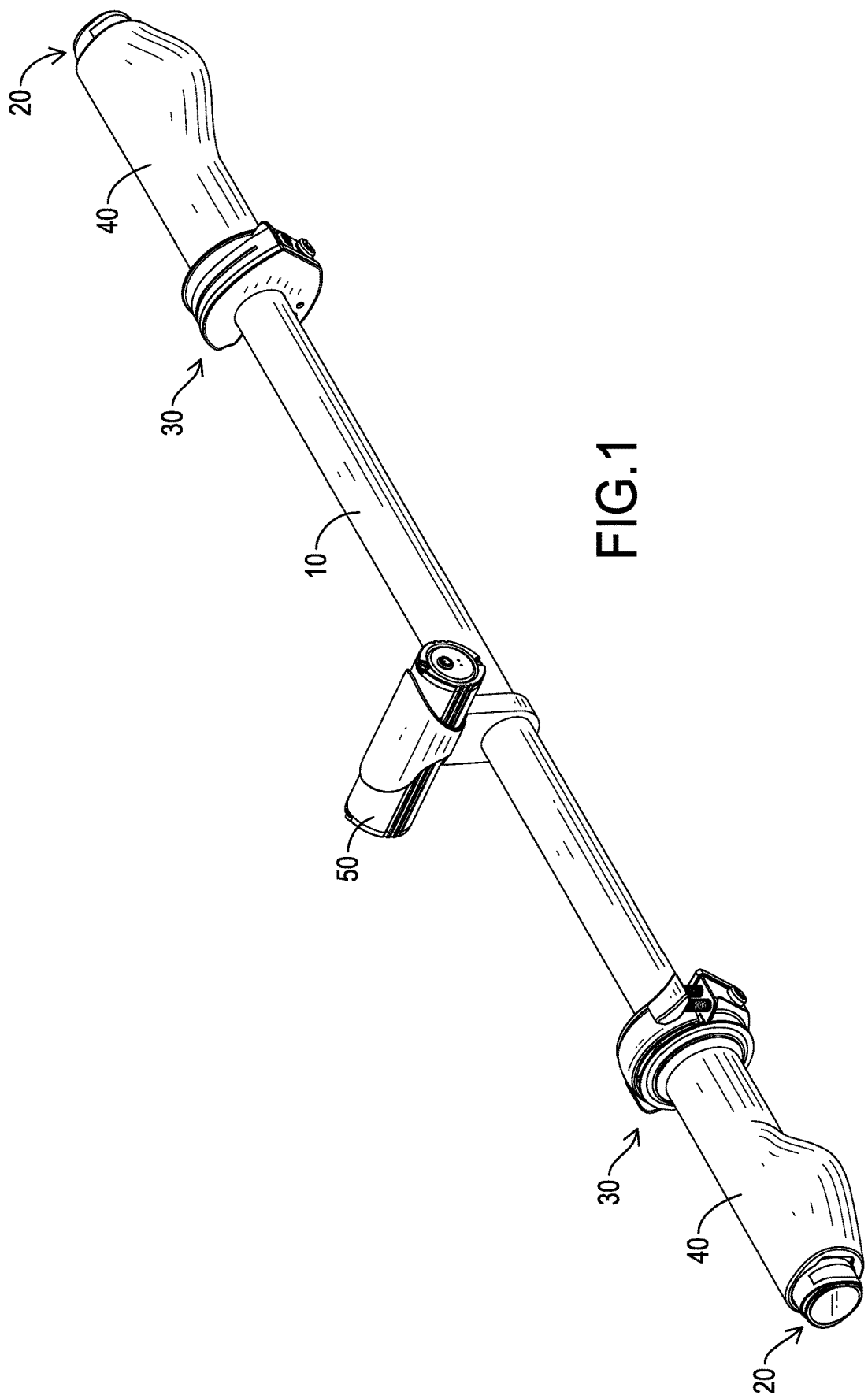
FIG. 1 is a perspective view of a handlebar grip set in accordance with the present invention.
Figure 2:
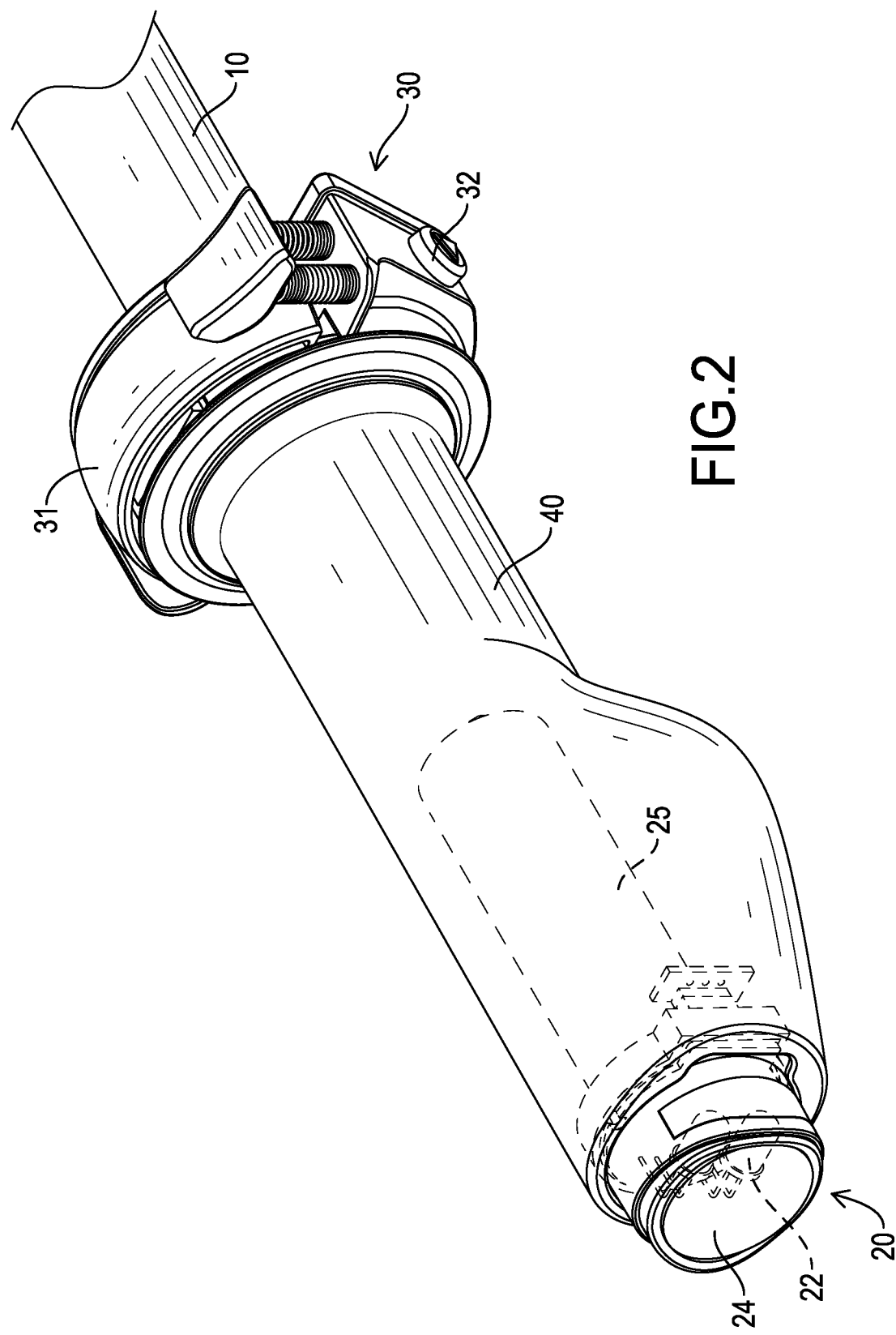
FIG. 2 is an enlarged perspective view of the handlebar grip set in FIG. 1.
Figure 3:
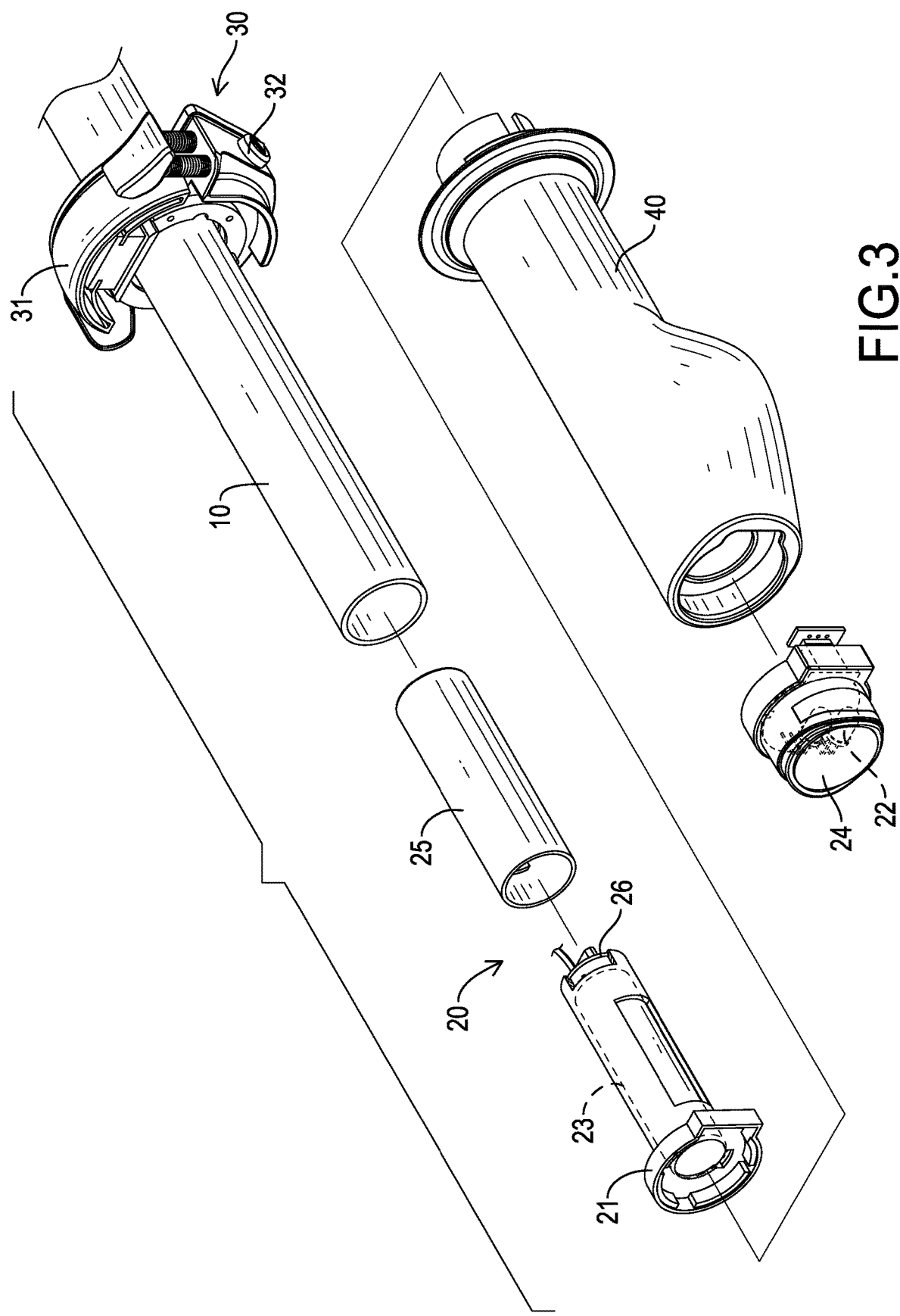
FIG. 3 is a partially exploded perspective view of the handlebar grip set in FIG. 1.
Figure 4:
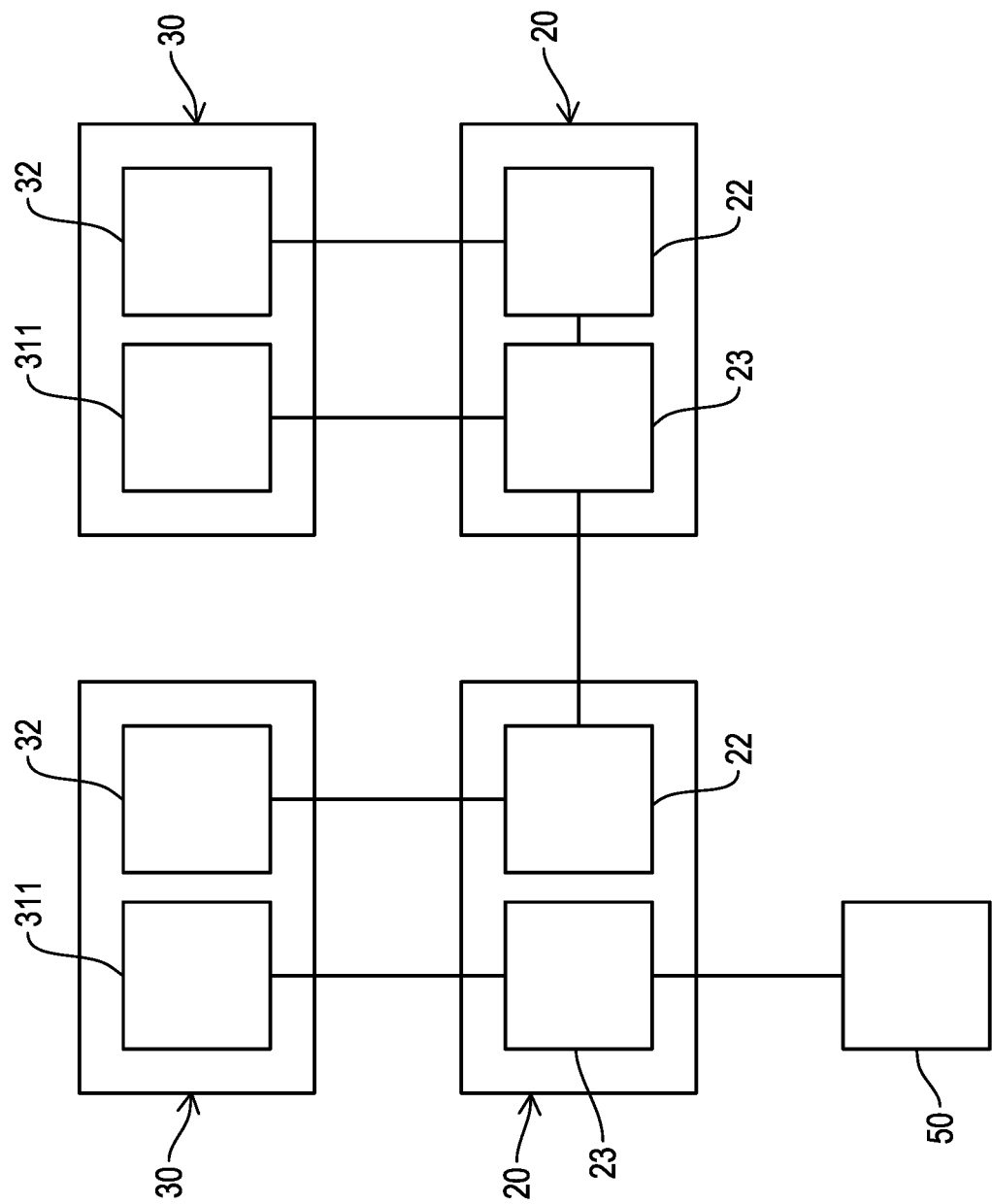
FIG. 4 is an electrical block diagram of the handlebar grip set in accordance with the present invention.

With reference to FIGS. 1 to 3, a handlebar grip set in accordance with the present invention is configured to be assembled to handlebars 10 and has two turn signals 20, two operating kits 30, and two grips 40.

With reference to FIGS. 1 to 3, the handlebars 10 is flat handlebars and has two opposite ends.

With reference to FIGS. 1 to 3, the two turn signals 20 are respectively assembled to the two opposite ends of the handlebars 10. Each one of the two turn signals 20 has a base 21 being detachable, an illumination module 22, a battery 23, a housing 24, and a sleeve 25.

With reference to FIGS. 1 to 3, the two turn signals 20 are similar, so for conciseness in description, only one of the two turn signals 20 assembled at a left end of the handlebars 10 is illustrated below. Wherein, the base 21 of the turn signal 20 is similarly tubular and has a first end and a second end opposite each other. The second end of the base 21 is inserted into the handlebars 10. The illumination module 22 is assembled to the first end of the base 21 and is disposed outside the handlebars 10. The illumination module 22 has a circuit board and illuminating elements electrically connected to the circuit board. Detailed structures of the illumination module 22 are conventional and are not further illustrated in the present invention. The battery 23 is received inside the base 21 and is electrically connected to the illumination module 22. The housing 24 is assembled to the first end of the base 21 and covers the illumination module 22. The sleeve 25 sleeves the base 21 and is disposed between the base 21 and the handlebar 10. In the present invention, the sleeve 25 is a silicone sleeve.

In the present invention, the battery 23 of each one of the two turn signals 20 is a rechargeable battery. Each one of the two turn signals 20 further has a charging board 26. The charging board 26 is assembled at the second end of the base 21, is electrically connected to the battery 23 of the turn signal 20, and is disposed inside the handlebars 10. The charging board 26 may be connected to an electrical power source for charging the battery 23.

With reference to FIGS. 1 to 3, each one of the two operating kits 30 has a mount 31 and a button module 32. The mount 31 of each one of the two operating kits 30 is assembled to the handlebars 10. The button module 32 is assembled to the mount 31 and has a button. The two button modules 32 of the two operating kits 30 are electrically connected to the two illumination modules 22 of the two turn signals 20 respectively. Therefore, the two turn signals 20 can be controlled via the two operating kits 30 respectively.

When the handlebar grip set of the present invention is applied to an electric bicycle, the charging board 26 of each one of the two turn signals 20 may be electrically connected to a motor. The battery 23 of each turn signal 20 may be omitted accordingly. Practically, the electrical connection mentioned in the present invention may be a wired connection or a wireless connection. The two button modules 32 may be respectively wireless connected to the two illumination modules 22 of the two turning signals 20 via Bluetooth. The mount 31 of each operating kit 30 may have a charging connector 311. The two charging connectors 311 of the two mounts 31 of the two operating kits 30 may be electrically connected to the two batteries 23 of the two turning signals 20. The charging connector 311 of the mount 31 of each operating kit 30 may have a charging socket adjacent to the button module 32 of the operating kit 30.

Alternatively, the two batteries 23 of the two turning signals 20 may be electrically connected in series. Therefore, only one of the two operating kits 30 has the charging connector 311 to be electrically connected to the battery 23 of one of the two turning signals 20.

With reference to FIG. 3, the base 21, the illumination module 22, the battery 23, and the housing 24 of each one of the two turn signals 20 are detachably connected. Each one of the above parts is replaceable when it malfunctions. The present invention can be repaired conveniently.

With reference to FIGS. 1 to 3, the two grips 40 are respectively assembled at the two ends of the handlebars 10. The two grips 40 respectively surround the two bases 21 of the two turn signals 20.

With reference to FIGS. 1 to 4, the present invention further has a headlight 50. Practically, the battery 23 of one of the two turn signals 20 is able to be electrically connected to the two illumination modules 22 of the two turn signals 20 for powering. The battery 23 of the other one of the two turn signals 20 can be electrically connected to the headlight 50.

Figure 5:
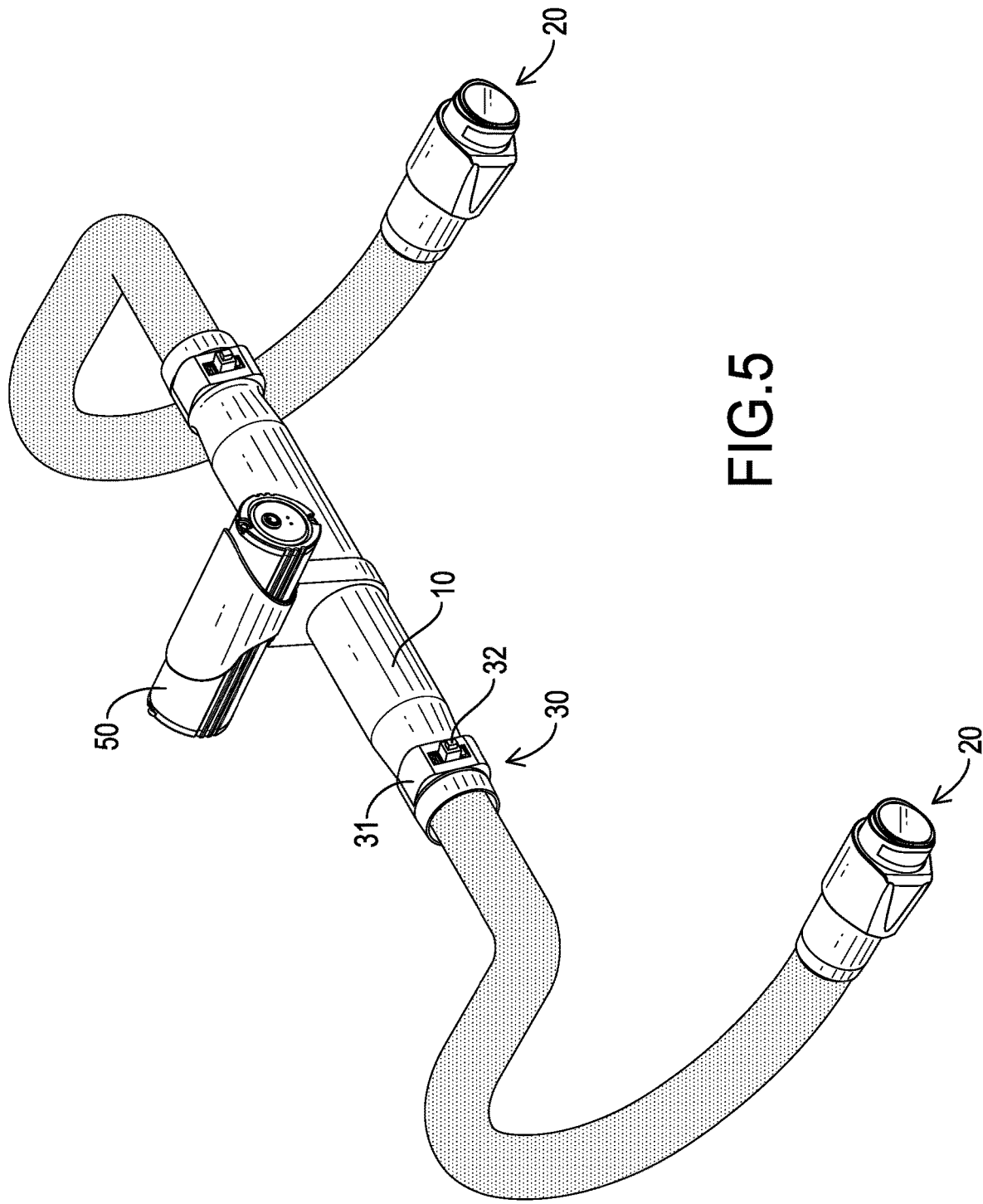
FIG. 5 is another perspective view of the handlebar grip set in accordance with the present invention and shows the handlebar grip set of the present invention assembled to aero handlebars.
Figure 6:
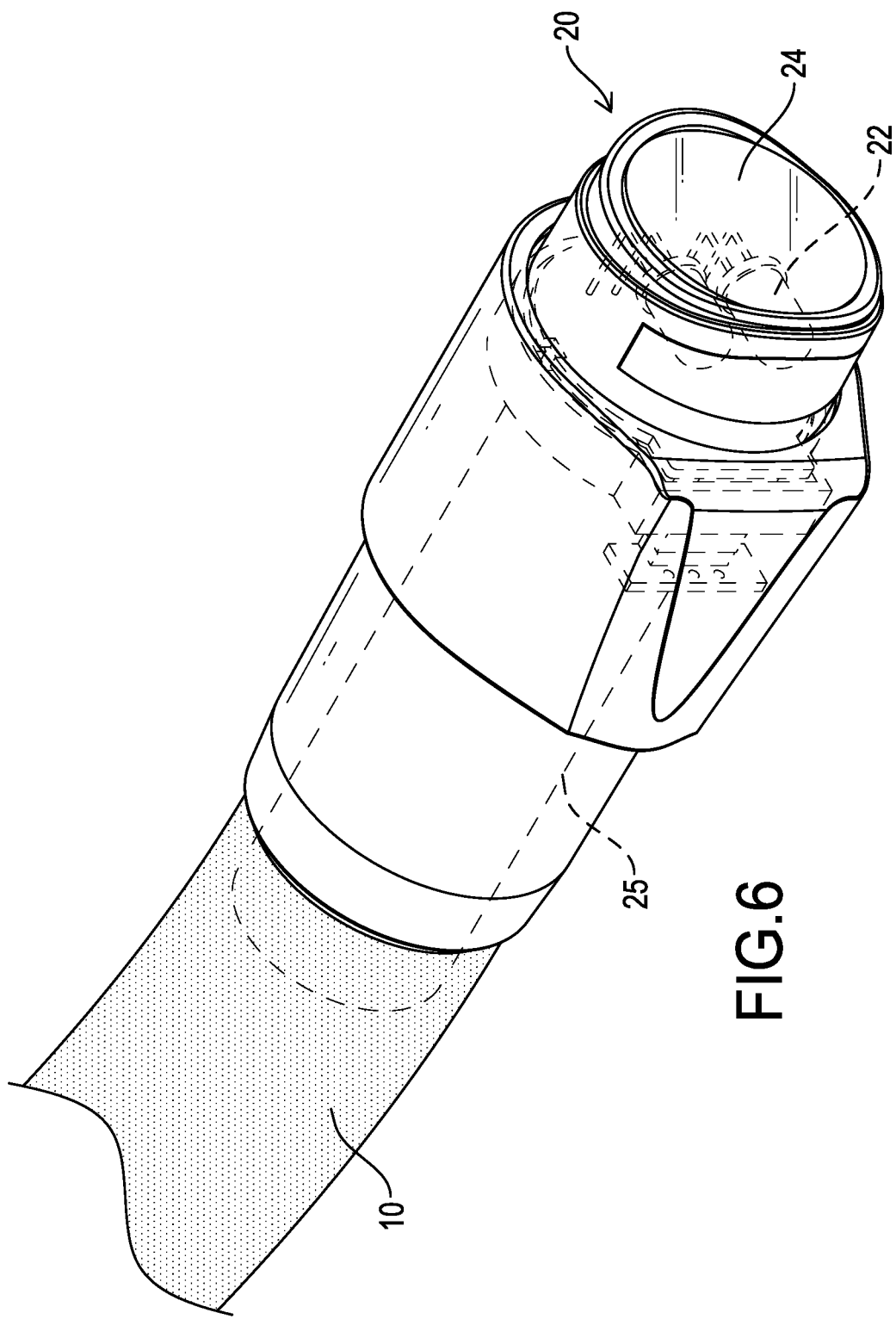
FIG. 6 is an enlarged perspective view of the handlebar grip set in FIG. 5.

With reference to FIGS. 5 and 6, the handlebars 10 may be aero handlebars.

With reference to FIG. 7, the handlebar grip set of the present invention may be used with two rear trafficators 60. Each one of the two rear trafficators 60 has a fastening unit 61 and a light strip 62. The fastening unit 61 is made of flexible materials and has a body 611, a first strap 612, and a second strap 613. The body 611 is rectangular and has two opposite ends. The first strap 612 and the second strap 613 are respectively disposed at the two ends of the body 611. The light strip 62 is disposed at the body 611 and is electrically connected to the battery 23 of one of the two turn signals 20.

With reference to FIG. 7, the fastening unit 61 of each one of the two rear trafficators 60 can be attached to a tube of a frame of a bicycle. The first strap 612 and the second strap 613 can circulate around the tube to fix the rear trafficator 60 to the tube. Specifically, the first strap 612 has two opposite ends, a buckle 6121, and multiple engaging holes 6122. The buckle 6121 is disposed at one of the two ends of the first strap 612, and the multiple engaging holes 6122 are disposed at the other one of the two ends of the first strap 612. When the first strap 612 is wrapped around the tube, the buckle 6121 is engaged with one of the multiple engaging holes 6122 to fix the first strap 612 to the tube. The second strap 613 has two opposite ends, multiple blocking portions 6131, and a restricting hole 6132. The multiple blocking portions 6131 are disposed at one of the two ends of the second strap 613, and the restricting hole 6132 is disposed at the other one of the two ends of the second strap 613. When the second strap 613 is wrapped around the tube, said one end with the blocking portions 6131 is inserted through the restricting hole 6132 and one of the blocking portions 6131 is restricted by the restricting hole 6132.

The handlebar grip set of the present invention is configured to be assembled to the two ends of the handlebars 10. In the present invention, the handlebar grip set has the two turn signals 20 and the two operating kits 30 respectively electrically connected to the two illumination modules 22 of the two turn signals 20. A user can control the two turn signals 20 via the two operating kits 30 to achieve a sufficient warning effect when the bicycle is turning.

In the present invention, the base 21, the illumination module 22, the battery 23, the housing 24, and the sleeve 25 of each of the two turn signals 20 are detachably assembled to one another. Broken parts of each turn signal 20 can be conveniently replaced by the user.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A handlebar grip set comprising:
   two turn signals, each one of the two turn signals being detachable and having
      a base;
      an illumination module assembled to the base; and
      a housing assembled to the base and covering the illumination module;
   two operating kits, each one of the two operation kits having a button module electrically connected to the illumination module of a corresponding one of the two turn signals; and
   two grips, each one of the two grips surrounding the base of a corresponding one of the two turn signals;
   wherein the base of each one of the two turn signals is configured to be assembled to one of two ends of handlebars,
   wherein each one of the two turn signals has a battery; the illumination modules of the two turn signals are electrically connected to the battery of at least one of the two turn signals; and
   wherein each one of the two operating kits has a mount; the mount of at least one of the two operating kits has a charging connector electrically connected to the battery of at least one of the two turn signals; the charging connector of the mount of the at least one of the two operating kits has a charging socket adjacent to the button module of the operating kit.

2. The handlebar grip set as claimed in claim 1, wherein each one of the two turn signals has a sleeve sleeving the base of the turn signal.

3. The handlebar grip set as claimed in claim 2, wherein each one of the two turn signals has a charging board electrically connected to the battery of the turn signal; and
   the battery of each one of the two turn signals is a rechargeable battery.

4. The handlebar grip set as claimed in claim 3, wherein the handlebar grip set has a headlight; and
   the battery of one of the two turn signals is electrically connected to the illumination module of each one of the two turn signals, the battery of the other one of the two turn signals is electrically connected to the headlight.

5. The handlebar grip set as claimed in claim 1, wherein the button module of each operating kit is assembled to the mount of said each operating kit.

6. The handlebar grip set as claimed in claim 2, wherein the button module of each operating kit is assembled to the mount of said each operating kit.

7. The handlebar grip set as claimed in claim 3, wherein the button module of each operating kit is assembled to the mount of said each operating kit.

8. The handlebar grip set as claimed in claim 4, wherein the button module of each operating kit is assembled to the mount of said each operating kit.

\* \* \* \* \*